US012533037B2

(12) United States Patent
Sawanoi et al.

(10) Patent No.: US 12,533,037 B2
(45) Date of Patent: Jan. 27, 2026

(54) SPHYGMOMANOMETER, BLOOD PRESSURE MEASUREMENT METHOD, AND COMPUTER-READABLE RECORDING MEDIUM

(71) Applicant: OMRON HEALTHCARE CO., LTD., Muko (JP)

(72) Inventors: Yukiya Sawanoi, Kyoto (JP); Shingo Yamashita, Kyoto (JP); Mika Ezoe, Kyoto (JP)

(73) Assignee: OMRON HEALTHCARE CO., LTD., Kyoto (JP)

( * ) Notice: Subject to any disclaimer, the term of this patent is extended or adjusted under 35 U.S.C. 154(b) by 922 days.

(21) Appl. No.: 17/739,262

(22) Filed: May 9, 2022

(65) Prior Publication Data

US 2022/0257129 A1 Aug. 18, 2022

Related U.S. Application Data

(63) Continuation of application No. PCT/JP2020/042297, filed on Nov. 12, 2020.

(30) Foreign Application Priority Data

Nov. 14, 2019 (JP) .................................. 2019-206318

(51) Int. Cl.
*A61B 5/022* (2006.01)
*A61B 5/00* (2006.01)

(52) U.S. Cl.
CPC ........ *A61B 5/02225* (2013.01); *A61B 5/6824* (2013.01); *A61B 5/7435* (2013.01);
(Continued)

(58) Field of Classification Search
CPC . A61B 5/02225; A61B 5/6824; A61B 5/7435; A61B 5/746; A61B 5/7475; A61B 2562/0247; A61B 5/02; A61B 5/00–7495
See application file for complete search history.

(56) References Cited

U.S. PATENT DOCUMENTS

2009/0216134 A1* 8/2009 Hollinger ............... A61B 5/681
600/496
2018/0263516 A1* 9/2018 Woehrle ............. A61B 5/02225

FOREIGN PATENT DOCUMENTS

CN        102307519 A    1/2012
CN        105105736 A    12/2015
(Continued)

OTHER PUBLICATIONS

Jan. 19, 2021 Search Report issued in International Patent Application No. PCT/JP2020/042297.
(Continued)

*Primary Examiner* — Tse W Chen
*Assistant Examiner* — Evelyn Grace Park
(74) *Attorney, Agent, or Firm* — Oliff PLC

(57) ABSTRACT

A sphygmomanometer performs blood pressure measurement by an oscillometric method using a pressure sensor detecting pressure inside a blood pressure measuring cuff by temporarily pressing a wrist as a measurement target site with the cuff, also including: a mode operation unit inputting an instruction mode for switching a mode to a nighttime blood pressure measurement mode wherein the blood pressure measurement is automatically started according to a predetermined schedule; a first determination unit that temporarily pressurizes the cuff to a pressure lower than a cuff pressure used for the blood pressure measurement along with an input instruction mode and a shift to the nighttime blood pressure measurement mode, and determines a winding state of the cuff on the basis of an output of the pressure sensor; and a notification unit that, along with determination of the winding state of the cuff, notifies the determined winding state of the cuff.

7 Claims, 8 Drawing Sheets

(52) U.S. Cl.
CPC ............ *A61B 5/746* (2013.01); *A61B 5/7475* (2013.01); *A61B 2562/0247* (2013.01)

(56) References Cited

FOREIGN PATENT DOCUMENTS

| JP | 2011-152307 A | 8/2011 |
| JP | 5408142 B2 | 2/2014 |
| WO | 2012/018029 A1 | 2/2012 |
| WO | 2018/168797 A1 | 9/2018 |
| WO | 2018/168799 A1 | 9/2018 |
| WO | 2019/111779 A1 | 6/2019 |

OTHER PUBLICATIONS

Sep. 12, 2024 Office Action issued in Chinese Patent Application No. 202080078778.8.

* cited by examiner

SPHYGMOMANOMETER, BLOOD PRESSURE MEASUREMENT METHOD, AND COMPUTER-READABLE RECORDING MEDIUM

CROSS-REFERENCE TO RELATED APPLICATIONS

This is a continuation application of International Application No. PCT/JP2020/042297, with an International filing date of Nov. 12, 2020, which claims priority of Japanese Patent Application No. 2019-206318 filed on Nov. 14, 2019, the entire content of which is hereby incorporated by reference.

TECHNICAL FIELD

The present invention relates to a sphygmomanometer, and more particularly to a sphygmomanometer having a nighttime (sleep) blood pressure measurement mode. Further, the present invention also relates to a blood pressure measurement method of measuring a blood pressure by such a sphygmomanometer. Furthermore, the present invention also relates to a computer-readable recording medium storing a program for causing a computer to execute such a blood pressure measurement method.

BACKGROUND ART

In the blood pressure measurement by an oscillometric method of measuring a blood pressure while compressing a measurement target site with a cuff, it is necessary to wind the cuff tightly around the measurement target site (an upper arm or a wrist) in order to perform accurate measurement. For example, when the cuff is loosely wound, the pressure of the cuff is not correctly transmitted to an artery, and accurate blood pressure measurement cannot be performed. Therefore, Patent Document 1 (JP 5408142 B2) discloses a technique in which, when a blood pressure measurement start switch is turned on, it is determined whether the cuff is tightly wound around a measurement site ("tight winding"), "perfectly" wound ("perfect winding"), or loosely wound ("loose winding") by detecting a winding strength of the cuff around the measurement site, and a result of the determination is notified to a subject.

In the technique of Patent Document 1, after the blood pressure measurement start switch is turned on, the winding determination is performed immediately before the blood pressure measurement is started, and if the cuff is not appropriately (perfectly) wound around the measurement target site, the subject is notified of rewinding of the cuff, and if the cuff is appropriately (perfectly) wound around the measurement target site, the blood pressure measurement is started. Therefore, according to this technique, the blood pressure measurement is performed in a state where the cuff is appropriately wound, and the obtained measurement result is highly reliable.

However, the winding determination of Patent Document 1 can be applied to normal blood pressure measurement (in other words, blood pressure measurement during non-sleeping), but cannot be directly applied to so-called nighttime blood pressure measurement in which a blood pressure is measured while a subject is sleeping. This is because the subject is sleeping in the nighttime blood pressure measurement, and thus even if the subject is notified of a result of the winding determination at the time of the blood pressure measurement, the subject who is sleeping cannot rewind the cuff.

SUMMARY OF THE INVENTION

The present invention has been made to solve the above-described problem, and an object of the present invention is to provide a sphygmomanometer and a blood pressure measurement method capable of performing accurate blood pressure measurement when the blood pressure measurement is performed while a subject is sleeping. Further, another object of the present invention is to provide a computer-readable recording medium storing a program for causing a computer to execute such a blood pressure measurement method.

To this end, the sphygmomanometer of the present disclosure performs blood pressure measurement by an oscillometric method using a pressure sensor that detects a pressure inside a blood pressure measuring cuff by temporarily pressing a wrist as a measurement target site with the cuff, the sphygmomanometer comprising:

a mode operation unit that inputs a mode instruction for switching a mode between a normal blood pressure measurement mode in which the blood pressure measurement is performed according to an input blood pressure measurement instruction and a nighttime blood pressure measurement mode in which the blood pressure measurement is automatically started according to a predetermined schedule;

a first determination unit that temporarily pressurizes the cuff to a pressure lower than a cuff pressure used for the blood pressure measurement along with an input of the mode instruction and a shift to the nighttime blood pressure measurement mode, and determines a winding state of the cuff based on an output of the pressure sensor; and a second determination unit that temporarily pressurizes the cuff to a pressure lower than the cuff pressure used for the blood pressure measurement, and determines a winding state of the cuff according to a normal determination criterion that defines a degree of the winding state of the cuff based on an output of the pressure sensor, in advance before the blood pressure measurement instruction is input and the blood pressure measurement is performed in the normal blood pressure measurement mode, wherein the first determination unit determines the winding state of the cuff according to a strict determination criterion shifted in a direction in which the degree of the winding state of the cuff becomes tighter than the normal determination criterion in the nighttime blood pressure measurement mode, and the sphygmomanometer includes a notification unit that, along with determination of the winding state of the cuff, notifies the determined winding state of the cuff.

In the present specification, the "mode operation unit" is, for example, a switch provided in a main body of the sphygmomanometer, and may receive a switch on as an instruction by a user, or may be configured by a communication unit that receives an instruction from a smartphone or the like existing outside the sphygmomanometer via wireless communication.

"Along with a shift to the nighttime blood pressure measurement mode" typically refers to a time point at which the shift to the nighttime blood pressure measurement mode is made, but may be within a time at which the subject is expected not to fall asleep yet, for example, within 5 minutes from the time point. Similarly, "along with determination of the winding state of the cuff" typically refers to a time point at which the winding state of the cuff is determined, but may be within a time period in which the subject is expected not to fall asleep yet, for example, within 5 minutes from the time point.

The "winding state of the cuff" refers to a state representing appropriateness/inappropriateness of winding of the cuff around the measurement target site. For example, as disclosed in Patent Document 1, it indicates whether the cuff is tightly wound around the measurement site ("tight winding"), "perfectly" wound ("perfect winding"), or loosely wound ("loose winding"). In addition, the "degree of the winding state of the cuff" refers to a degree from a state in which the cuff is loosely wound around the measurement target site to a state in which the cuff is tightly wound around the measurement target site.

In another aspect, a blood pressure measurement method of the present disclosure is implemented with a sphygmomanometer that performs blood pressure measurement by an oscillometric method using a pressure sensor that detects a pressure inside a blood pressure measuring cuff by temporarily pressing a measurement target site of a subject with the cuff, the sphygmomanometer including a mode operation unit that inputs a mode instruction for switching a mode between a normal blood pressure measurement mode in which the blood pressure measurement is performed according to an input blood pressure measurement instruction and a nighttime blood pressure measurement mode in which the blood pressure measurement is automatically started according to a predetermined schedule, the blood pressure measurement method comprising:

a first determination method of temporarily pressurizing the cuff to a pressure lower than a cuff pressure used for the blood pressure measurement along with an input of the mode instruction and a shift to the nighttime blood pressure measurement mode, and determining a winding state of the cuff based on an output of the pressure sensor; and a second determination method of temporarily pressurizing the cuff to a pressure lower than the cuff pressure used for the blood pressure measurement, and determining a winding state of the cuff according to a normal determination criterion that defines a degree of the winding state of the cuff based on an output of the pressure sensor, in advance before the blood pressure measurement instruction is input and the blood pressure measurement is performed in the normal blood pressure measurement mode, wherein the first determination method determines the winding state of the cuff according to a strict determination criterion shifted in a direction in which the degree of the winding state of the cuff becomes tighter than the normal determination criterion in the nighttime blood pressure measurement mode, and the blood pressure measurement method includes determining the winding state of the cuff according to the first determination method or the second determination method, and along with determination of the winding state of the cuff, notifying the determined winding state of the cuff.

In still another aspect, a computer-readable recording medium of the present disclosure is a computer-readable recording medium non-transitorily storing a program for causing a computer to execute the blood pressure measurement method.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

MODES FOR CARRYING OUT THE INVENTION

Hereinafter, an embodiment of a wrist-type sphygmomanometer according to the present invention will be described with reference to the accompanying drawings.

[Wrist-Type Sphygmomanometer]

Figure 1:
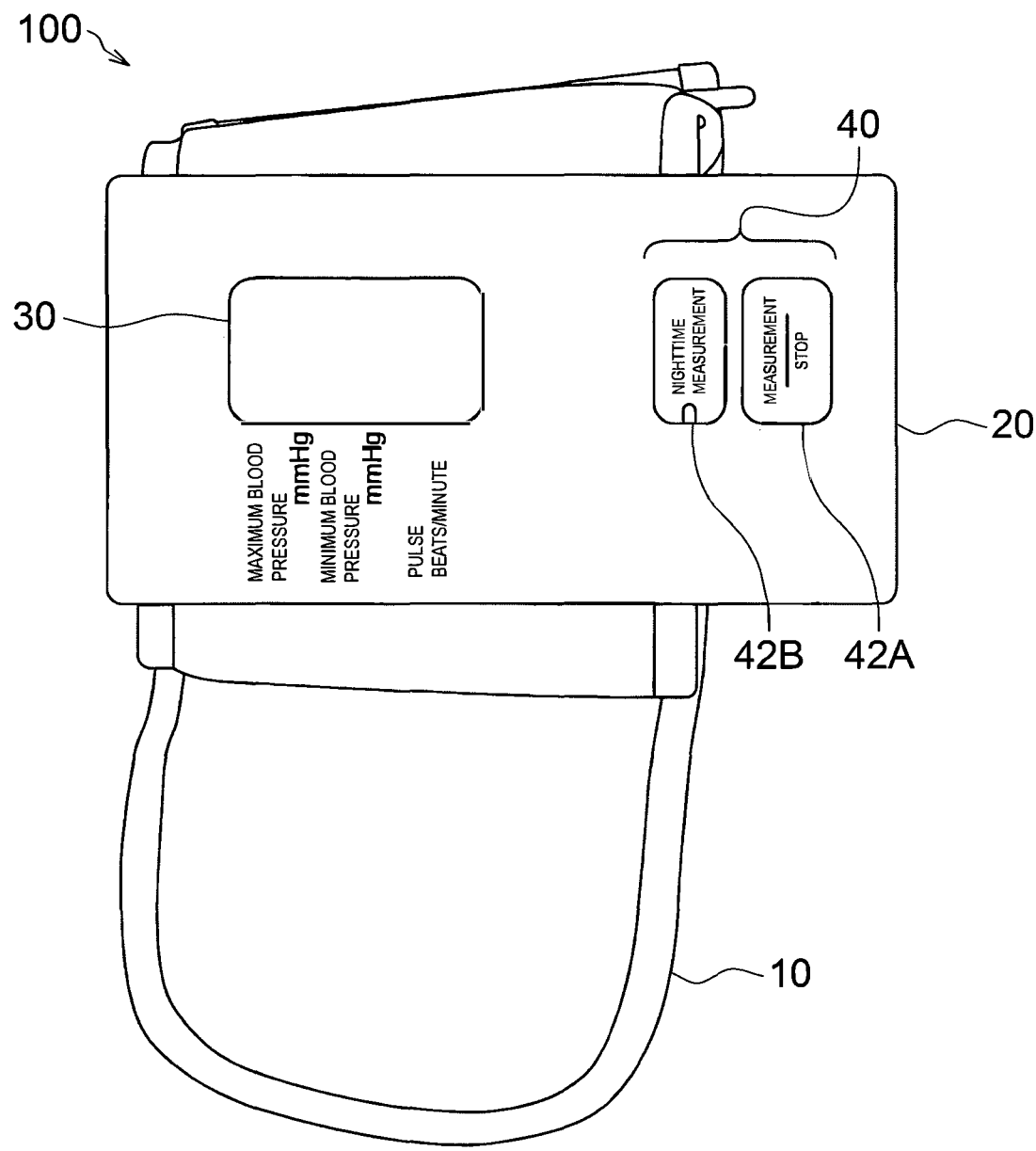
FIG. 1 is a schematic diagram of a wrist-type sphygmomanometer according to an embodiment of the present invention.

FIG. 1 illustrates a schematic configuration of a wrist-type sphygmomanometer (Hereinafter, the sphygmomanometer is appropriately referred to as a "sphygmomanometer".) 100 according to an embodiment of the present invention. As described later, the sphygmomanometer 100 has a normal mode in which blood pressure measurement is started immediately after a blood pressure measurement switch is turned on, and a nighttime mode in which the blood pressure measurement is started at a predetermined reservation time or at a reservation time after a lapse of a predetermined time from a specified time.

[Configuration of Wrist-Type Sphygmomanometer]

As illustrated in FIG. 1, the sphygmomanometer 100 includes a blood pressure measuring cuff 10 to be wound around a measurement target site of a subject, and a sphygmomanometer main body 20 integrally attached to the cuff 10.

Figure 2:
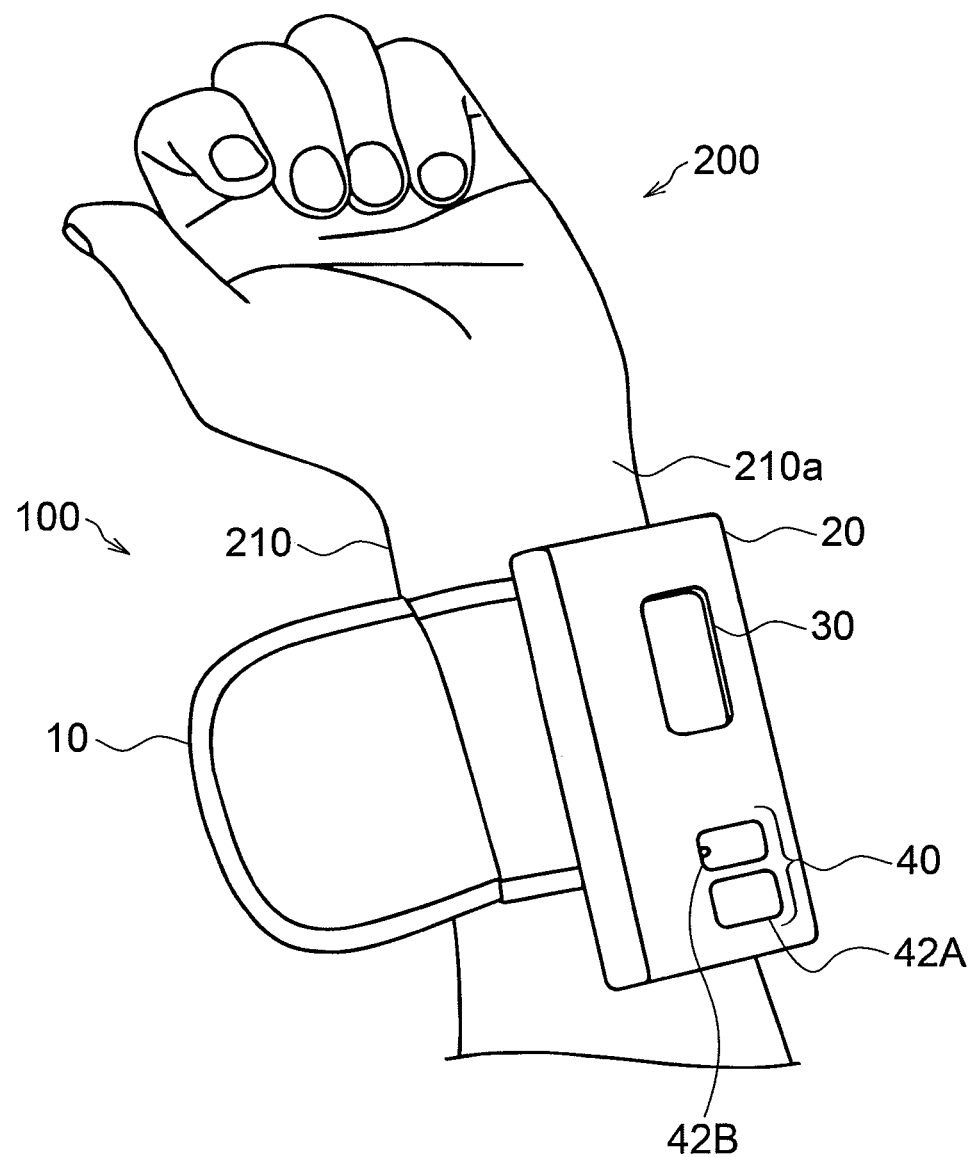
FIG. 2 is a schematic diagram illustrating a state in which the wrist-type sphygmomanometer illustrated in FIG. 1 is wound around a left wrist.

As illustrated in FIG. 2, the sphygmomanometer 100 according to the embodiment is a wrist-type sphygmomanometer. Therefore, the cuff 10 has an elongated band shape so as to be wound around a left wrist 210 of a subject 200, for example. The cuff 10 contains an air bladder 12 (see FIG. 3) for compressing the left wrist 210. Note that, in order to always maintain the cuff 10 in an annular shape, a curler (not illustrated) having appropriate flexibility may be provided in the cuff 10.

The sphygmomanometer main body 20 is integrally attached to a substantially central portion in a longitudinal direction of the band-shaped cuff 10. In the embodiment, a portion to which the sphygmomanometer main body 20 is attached is supposed to correspond to a palmar surface (surface on a palm side) 210a of the left wrist 210.

The sphygmomanometer main body 20 has a flat substantially rectangular parallelepiped shape along an outer peripheral surface of the cuff 10, and is formed small and thin so as not to disturb the sleep of the subject 200. A corner portion connecting an upper surface (surface appearing in FIG. 1) of the sphygmomanometer main body 20 and a side surface surrounding the upper surface is chamfered in a curved shape.

As illustrated in FIG. 1, a display unit (notification unit) 30 forming a display screen and an operation unit 40 for inputting an instruction from the subject 200 are provided on an upper surface on a side farthest from the left wrist 210 among outer surfaces of the sphygmomanometer main body 20.

In the embodiment, the display unit 30 includes a liquid crystal display (LCD), and is configured to display predetermined information, for example, a maximum blood pressure (unit; mmHg), a minimum blood pressure (units; mmHg), pulse (units; beats per minute) according to a control signal from a central processing unit (CPU) 110 described later, and further, a winding determination result of the cuff 10 described later. Note that the display unit 30 may be either an organic EL display or a light emitting diode (LED).

The operation unit 40 includes a plurality of buttons or switches operated by the subject 200. In the embodiment, the operation unit 40 includes a blood pressure measurement start switch 42A for the subject 200 to input a blood pressure measurement instruction in a normal mode, and a nighttime measurement switch 42B for the subject 200 to input a blood pressure measurement instruction in a nighttime mode. The blood pressure measurement start switch 42A functions as a switch that stops the blood pressure measurement being executed when the switch is pressed during the blood pressure measurement.

In the following description, "normal blood pressure measurement" refers to blood pressure measurement started immediately after the blood pressure measurement start switch 42A is turned on. Further, in the following description, "nighttime blood pressure measurement" refers to blood pressure measurement that is automatically performed according to a predetermined schedule, for example, during sleep of the subject 200 on the basis of an instruction input through the nighttime measurement switch 42B. The blood pressure measurement performed according to the predetermined schedule is, for example, blood pressure measurement performed at a predetermined time such as midnight 1:00, 2:00, or 3:00, or blood pressure measurement performed, for example, 2 hours and/or 4 hours after the nighttime measurement switch 42B is pressed.

In the embodiment, both the blood pressure measurement switch 42A and the nighttime measurement switch 42B are momentary type (self-return type) switches, and are configured to be turned on only while being pushed down, and to be returned to an off state when being separated.

Figure 3:
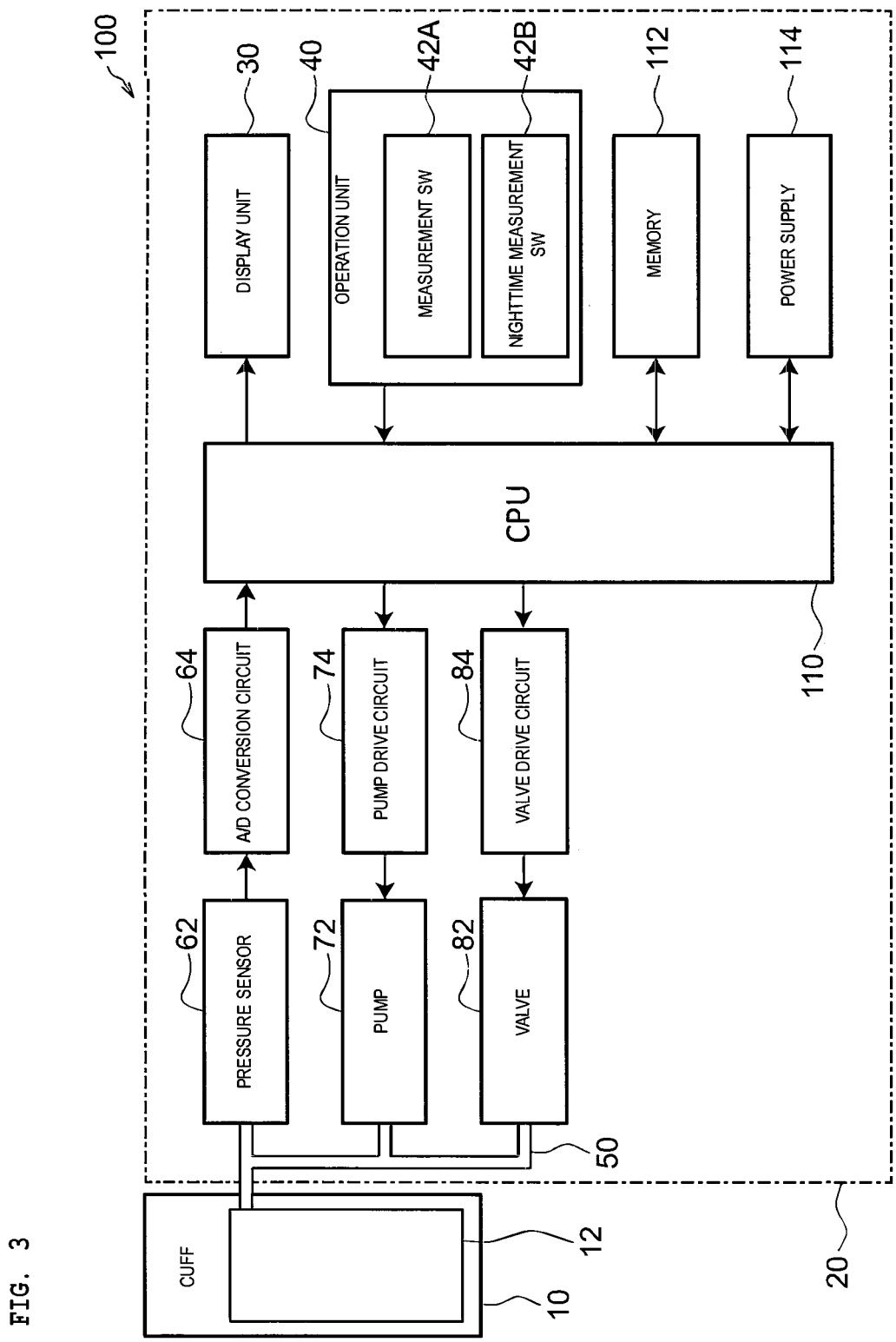
FIG. 3 is a block diagram of the wrist-type sphygmomanometer illustrated in FIG. 1.

FIG. 3 illustrates a block configuration of the sphygmomanometer 100.

The air bladder 12 included in the cuff 10 described above and various fluid control devices (described below) included in the sphygmomanometer main body 20 are connected by an air pipe 50 so that fluid can flow.

In addition to the display unit 30 and the operation unit 40 described above, the sphygmomanometer main body 20 includes the CPU 110 as a control unit, a memory 112 as a storage unit, a power supply unit 114, a pressure sensor 62, a pump 72, and a valve 82. Further, the sphygmomanometer main body 20 includes an A/D conversion circuit 64 that converts an output of the pressure sensor 62 from an analog signal to a digital signal, a pump drive circuit 74 that drives the pump 72, and a valve drive circuit 84 that drives the valve 82. The pressure sensor 62, the pump 72, and the valve 82 are connected to the air bladder 12 so as to be able to flow in a fluid manner through the air pipe 50.

The memory 112 stores a program for controlling the sphygmomanometer 100, data used for controlling the sphygmomanometer 100, setting data for setting various functions of the sphygmomanometer 100, data of measurement results of blood pressure values, and the like. The memory 112 is also used as a work memory that temporarily stores various types of information during program execution. In particular, the memory 112 according to the embodiment is configured as a program storage unit, and stores a normal blood pressure measurement program and a nighttime blood pressure measurement program for calculating a blood pressure by an oscillometric method to be described later, a normal winding determination program for determining a winding state of the cuff 10 in normal blood pressure measurement, and a nighttime winding determination program for determining a winding state of the cuff 10 in nighttime blood pressure measurement.

The CPU 110 is configured to control an operation of the entire sphygmomanometer 100. Specifically, the CPU 110 is configured as a pressure control unit that drives the pump 72 or the valve 82 according to the program for controlling the sphygmomanometer 100 stored in the memory 112, a first determination unit that determines a winding state of the cuff 10 based on an output of the pressure sensor 62 by the nighttime winding determination program to be described later, a second determination unit that determines a winding state of the cuff 10 based on an output of the pressure sensor 62 by the normal winding determination program to be described later, and a measurement implementation unit that performs blood pressure measurement by the normal blood pressure measurement program or the nighttime blood pressure measurement program to be described later. The CPU 110 also displays a blood pressure value obtained by performing the blood pressure measurement and a winding determination result of the cuff 10 on the display unit 30, and stores the blood pressure value and the winding determination result in the memory 112.

In the embodiment, the power supply unit 114 includes a secondary battery, and is configured to supply power to each unit of the CPU 110, the pressure sensor 62, the pump 72, the valve 82, the display unit 30, the memory 112, the A/D conversion circuit 64, the pump drive circuit 74, and the valve drive circuit 84. The power supply unit 114 is also configured to be able to switch between on and off states, and is turned on when the blood pressure measurement switch 42A is continuously pressed for 3 seconds or more, for example, in the off state.

The pump 72 is configured to supply air as a fluid to the air bladder 12 through the air pipe 50 in order to increase a pressure in the air bladder 12 built in the cuff 10. The valve 82 is configured to discharge the air in the air bladder 12 through the air pipe 50 by opening or hold a cuff pressure by closing in order to control the cuff pressure. The pump drive circuit 74 is configured to drive the pump 72 based on a control signal provided from the CPU 110. The valve drive circuit 84 is configured to open and close the valve 82 based on a control signal provided from the CPU 110.

The pressure sensor 62 and the A/D conversion circuit 64 are configured to detect the cuff pressure. The pressure sensor 62 in the embodiment is a piezoresistive pressure sensor, and detects and outputs the cuff pressure of the air bladder 12 as electric resistance due to the piezoresistive effect. The A/D conversion circuit 64 converts an output (electric resistance) of the pressure sensor 62 from an analog signal to a digital signal, and outputs the converted signal to the CPU 110. In the embodiment, the CPU 110 acquires the cuff pressure according to the electric resistance output from the pressure sensor 62.

[Blood Pressure Measurement Program]

The blood pressure measurement program calculates a blood pressure of the subject 200 with the sphygmomanometer main body 20 attached to the left wrist 210. The blood pressure measurement program includes a normal blood pressure measurement program and a nighttime blood pressure measurement program. The normal blood pressure measurement program assumes that the subject 200 sits on a chair or the like and keeps the left wrist 210 to which the sphygmomanometer main body 20 is attached at the same height as the heart of the subject 200. The nighttime blood pressure measurement program assumes that the subject 200 lies on a bed or the like, and the left wrist 210 to which the sphygmomanometer main body 20 is attached is placed at a position lower than the heart of the subject 200. It is known that different blood pressure values are calculated when a relationship between the height of the sphygmomanometer main body 20 and the height of the heart of the subject 200 is different. Therefore, in the normal blood pressure measurement program and the nighttime blood pressure measurement program, parameters used for blood pressure calculation are adjusted in advance in consideration of relationships between the assumed heights of the sphygmomanometer main body 20 and the heights of the heart of the subject 200.

When executing the normal blood pressure measurement program or the nighttime blood pressure measurement program, the CPU 110 obtains a pulse wave signal from a fluctuation component of a pulse wave included in the cuff pressure obtained by the pressure sensor 62, and calculates blood pressure values (maximum blood pressure and minimum blood pressure) using the respective programs stored in the memory 112.

[Winding Determination Program]

In the embodiment, the winding determination program determines whether the subject 200 is winding the cuff 10 around his/her left wrist 210 in a "perfectly wound state". In the present specification, the perfectly wound state refers to a state in which the length around a cylinder formed when the cuff 10 is wound around the left wrist 210 is substantially equal to the length around the left wrist 210, and an appropriate pressure is applied to the left wrist 210. Further, a state in which the cuff 10 is wound around the left wrist 210 more tightly than the perfectly wound state and applies a larger pressure to the left wrist 210 is referred to as a "tightly wound state". Furthermore, a state in which the cuff 10 is wound around the left wrist 210 more loosely than in the perfectly wound state and applies a smaller pressure to the left wrist 210 is referred to as a "loosely wound state".

Figure 4:
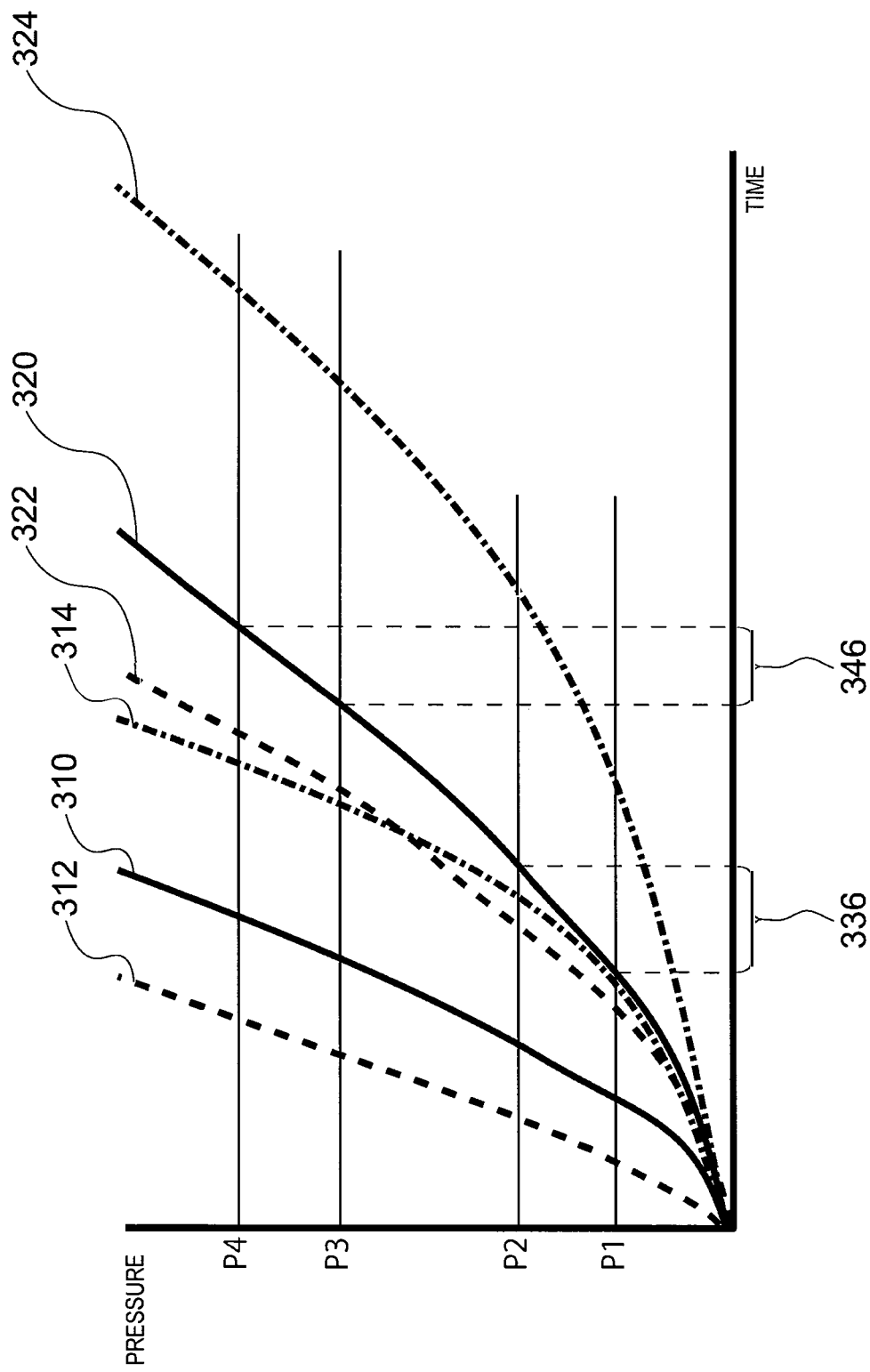
FIG. 4 is a graph illustrating a pressure of a cuff that changes with time.

A cuff pressure of the cuff 10 gradually increases with time while the pump 72 supplies air to the air bladder 12 of the cuff 10. As illustrated in FIG. 4, a relationship between the time and the cuff pressure varies depending on a winding state of the cuff 10.

In FIG. 4, a relationship between the time and the cuff pressure in a perfectly wound state is indicated by solid lines 310 and 320. A relationship between the time and the cuff pressure in a tightly wound state is indicated by broken lines 312 and 322. A relationship between the time and the cuff pressure in a loosely wound state is indicated by one-dot chain lines 314 and 324. Among the two solid lines 310 and 320, the solid line 310 on a left side of the drawing indicates a relationship between the time and the cuff pressure when a small-sized cuff is used, and the solid line 320 on a right side of the drawing indicates a relationship between the time and the cuff pressure when a large-sized cuff is used. Similarly, among the two broken lines 312 and 322, the broken line 312 on the left side of the drawing indicates a relationship between the time and the cuff pressure when a small-sized cuff is used, and the broken line 322 on the right side of the drawing indicates a relationship between the time and the cuff pressure when a large-sized cuff is used. Further, among the two one-dot chain lines, the one-dot chain line 314 on the left side of the drawing indicates a relationship between the time and the cuff pressure when a small-sized cuff is used, and the one-dot chain line 324 on the right side of the drawing indicates a relationship between the time and the cuff pressure when a large-sized cuff is used. From the illustrated relationship between the time and the cuff pressure, it can be seen that the cuff pressure tends to rapidly increase as a winding state of the cuff 10 is closer to a tight winding. Further, the relationship between the time and the cuff pressure varies depending on the size of the cuff 10, and the cuff pressure tends to rapidly increase as the cuff 10 has a smaller size.

As illustrated in FIG. 4, in the above-described relationship between the time and the cuff pressure, a difference in the increasing tendency of the cuff pressure that changes according to the winding state of the cuff 10 appears at an early stage, that is, a stage where the pressure is low. Therefore, a first time period 336, which is the time required for the cuff pressure to rise from a first pressure P1 to a second pressure P2 (P1<P2), reflects a winding state of the cuff 10. For example, the first time period 336 is shorter as the winding state of the cuff 10 is closer to a tight winding, and the first time period 336 is longer as the winding state of the cuff 10 is closer to a loose winding.

Further, the increasing tendency of the cuff pressure with respect to time varies depending on the size of the cuff 10, and the first time period 336 changes depending on the size of the cuff 10 even in the same winding state. As illustrated in FIG. 4, the influence of the size of the cuff 10 appears at a stage when the cuff pressure is high. Therefore, a second time period 346 until the cuff pressure rises from a third pressure P3 larger than the first pressure P1 and the second pressure P2 to a fourth pressure P4 (P3<P4) reflects the size of the cuff 10. In other words, for example, the second time period 346 decreases as the size of the cuff 10 decreases, and the second time period 346 increases as the size of the cuff 10 increases.

The pressures P1, P2, P3, and P4 are set to, for example, 10 mmHg, 15 mmHg, 25 mmHg, and 35 mmHg, respectively. However, these pressures are not limited, and may be determined on the basis of measured values within a range lower than a cuff pressure (a measured minimum blood pressure (diastolic blood pressure)) used for blood pressure measurement.

Figure 5:
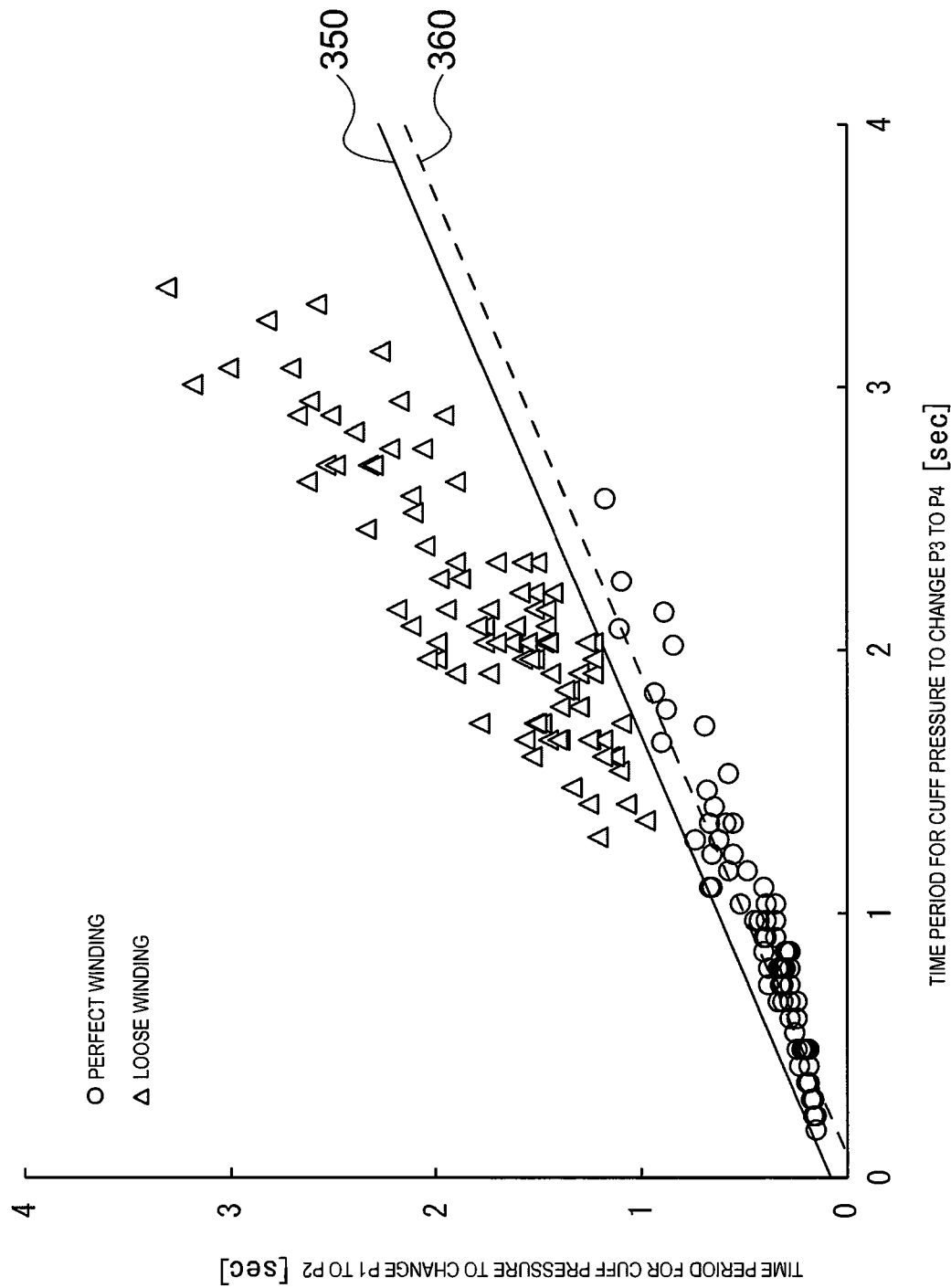
FIG. 5 is a graph illustrating a relationship between a first time and a second time depending on a winding state of the cuff.

FIG. 5 illustrates a relationship between the first time period 336 during which the cuff pressure changes from the first pressure P1 to the second pressure P2, and the second time period 346 during which the cuff pressure changes from the third pressure P3 to the fourth pressure P4. Each circle mark indicates a relationship between the first time period 336 and the second time period 346 actually measured in the perfectly wound state. Each triangle mark indicates a relationship between the first time period 336 and the second time period 346 actually measured in the loosely wound state. Although not illustrated, when a characteristic curve is drawn based on data indicated by the circle marks and data indicated by the triangle marks, the characteristic curve in the perfectly wound state indicated by the circle marks has a gentler gradient than the characteristic curve in the loosely wound state. Also, in both the perfectly wound state and the loosely wound state, the second time period 346 increases in accordance with the first time period 336. Thus, the first time period 336 and the second time period 346 exhibit a roughly linear relationship in both the perfectly wound state and the loosely wound state.

As described above, in the embodiment, for the normal blood pressure measurement (the blood pressure measurement performed in a state where the subject 200 sits on a chair), a normal perfect winding threshold 350 indicated by a linear function of a solid line is set as a normal determination criterion (normal determination criterion) for determining a winding state of the cuff 10 based on the relationship between the first time period 336 and the second time period 346 illustrated in FIG. 5. Then, when the blood pressure measurement start switch 42A is turned on with the cuff 10 wound around the left wrist 210 of the subject 200, air is supplied to the cuff 10, the first time period 336 and the second time period 346 are measured based on a change in the cuff pressure at that time, and whether or not the cuff is in a perfect winding state (or whether or not the cuff 10 is in a loose winding state) is determined by comparing the relationship between the first time period 336 and the second time period 346 with the normal perfect winding threshold 350.

On the other hand, since the nighttime blood pressure measurement (the blood pressure measurement performed when the subject 200 is in a lying position) is performed a plurality of times according to a predetermined schedule as described above, the cuff 10 tends to be easily loosened. Therefore, in the nighttime blood pressure measurement, the cuff 10 is preferably more perfectly wound so as not to be easily loosened. Therefore, for the nighttime blood pressure measurement, a nighttime perfect winding threshold (second reference value) 360 is set below the normal perfect winding threshold 350 so that the winding state of the cuff 10 in the nighttime blood pressure measurement becomes a strict determination criterion (strict determination criterion) shifted in a direction in which a degree of the winding state of the cuff 10 is tighter than the determination criterion (normal determination criterion) in the normal blood pressure measurement. Then, when the nighttime measurement switch 42B is turned on with the cuff 10 wound around the left wrist 210 of the subject 200, air is supplied to the cuff before the subject goes to bed, the first time period 336 and the second time period 346 are measured based on a change in the cuff pressure at that time, and whether or not the cuff is in a perfect winding state (or whether or not the cuff is in a loose winding state) is determined by comparing the relationship between the first time period and the second time period with the nighttime perfect winding threshold.

In the embodiment, a linear function of the normal perfect winding threshold 350 and a linear function of the nighttime perfect winding threshold 360 are set to, for example, the following formulas 1 and 2. However, these functions are merely examples, and the thresholds may be defined by other functions.

$$(\text{First time period}) = 0.55 \times (\text{second time period}) + 0.08 \quad [\text{Mathematical formula 1}]$$

$$(\text{First time period}) = 0.55 \times (\text{second time period}) - 0.05 \quad [\text{Mathematical formula 2}]$$

When executing the normal winding determination program or the nighttime winding determination program, the CPU 110 calculates the first time period 336 and the second time period 346 on the basis of the cuff pressure obtained by the pressure sensor 62, and determines whether the cuff is in a loose winding state or a perfect winding state depending on whether a point (point illustrated in FIG. 5) specified from the first time period 336 and the second time period 346 is in a region (loose winding region) above or in a region (perfect winding region) below the corresponding normal perfect winding threshold (linear function) 350 or nighttime perfect winding threshold (linear function) 360. The determination result is displayed on the display unit 30, for example.

[Normal Blood Pressure Measurement Mode]

The normal blood pressure measurement will be described. In this case, when the blood pressure measurement switch 42A of the sphygmomanometer main body 20 is pressed once in a state where the cuff 10 of the sphygmomanometer 100 is wound around the left wrist 210 of the subject 200, a normal blood pressure measurement instruction (mode instruction) is output to the CPU 110. As a result, the CPU 110 drives the pump 72 and the valve 82 to increase the cuff pressure of the cuff 10 and press the left wrist 210. In this state, the normal winding determination program described above is executed, and a text "Please rewind" is displayed on the display unit 30 when the cuff 10 is in a loose winding state, or a text "The winding is appropriate" is displayed on the display unit 30 when the cuff 10 is in a perfect winding state. Further, a normal blood pressure measurement program using the oscillometric method is executed. During the blood pressure measurement (for example, during pressurization of the cuff 10), when the blood pressure measurement switch 42A is pressed again, the pump 72 is stopped, the valve 82 is opened, and the blood pressure measurement is stopped.

Figure 6:
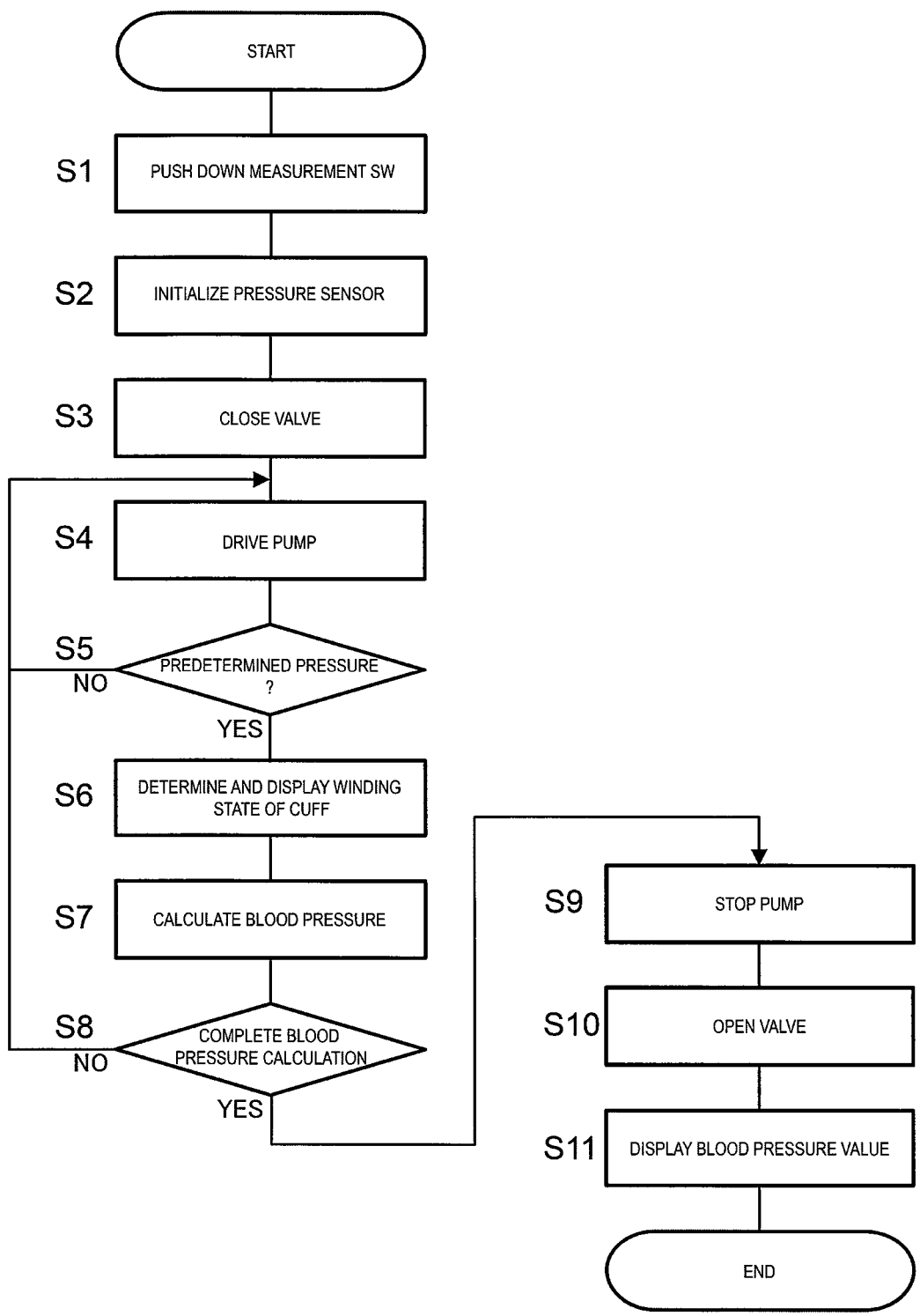
FIG. 6 is a flowchart of normal blood pressure measurement performed by the wrist-type sphygmomanometer illustrated in FIG. 1.

FIG. 6 illustrates an operation flow when the subject 200 performs the normal blood pressure measurement with the sphygmomanometer 100. During this normal blood pressure measurement, the subject 200 wearing the sphygmomanometer 100 on the left wrist 210 remains seated on a chair or the like.

In this state, as illustrated in step S1 of FIG. 6, when the subject 200 pushes down the blood pressure measurement switch 42A provided in the sphygmomanometer main body 20, and inputs a normal blood pressure measurement instruction, the CPU 110 initializes the pressure sensor 62 (step S2). Specifically, the CPU 110 initializes a processing memory area, stops the pump 72, and performs a 0 mmHg adjustment (The atmospheric pressure is set to 0 mmHg.) of the pressure sensor 62 in a state where the valve 82 is opened.

Next, the CPU 110 closes the valve 82 via the valve drive circuit 84 (step S3), and then drives the pump 72 via the pump drive circuit 74 to start pressurization of the cuff 10 (air bladder 12) (step S4). At this time, the CPU 110 controls a pressurization rate of the cuff pressure that is a pressure in the air bladder 12 based on the output of the pressure sensor 62 while supplying air from the pump 72 to the air bladder 12 through the air pipe 50.

When the cuff pressure output by the pressure sensor 62 does not reach a predetermined pressure (when the process branches to NO in step S5), step S4 is repeated. At this time, the CPU 110 obtains, from a change in the cuff pressure output by the pressure sensor 62, a time period during which the cuff pressure changes from the first pressure P1 to the second pressure P2, that is, the first time period 336, and a time period during which the cuff pressure changes from the third pressure P3 to the fourth pressure P4, that is, the second time period 346.

When the cuff pressure output by the pressure sensor 62 reaches the predetermined pressure (when branching to YES in step S5), the CPU 110 determines a winding state of the cuff 10 using the above-described normal winding determination program stored in the memory 112 on the basis of the obtained first time period 336 and second time period 346, and outputs a text "Please rewind" if the cuff 10 is in a loose winding state or a text "The winding is appropriate" if the cuff 10 is in a perfect winding state to the display unit 30 (step S6). As described above, by performing the blood pressure measurement only when the winding state of the cuff 10 is "appropriate", a measurement result obtained in the normal blood pressure measurement mode is highly reliable.

Next, in step S7, the CPU 110 calculates blood pressure values (the maximum blood pressure and the minimum blood pressure) using the normal blood pressure measurement program stored in the memory 112 based on a pulse wave signal obtained at this time.

At this time point, when the blood pressure values cannot be calculated yet due to lack of data (when the process branches to NO in step S8), the CPU 110 repeats the processing of steps S4 to S8 unless the cuff pressure reaches an upper limit pressure (For safety, for example, 300 mmHg is predetermined).

When the blood pressure value is calculated (when the process branches to YES in step S8), the CPU 110 stops the pump 72 (step S9), opens the valve 82 (step S10), and performs control to discharge the air in the cuff 10 (air bladder 12).

Thereafter, the CPU 110 displays the calculated blood pressure value on the display unit 30 (step S11), and performs control to store the blood pressure value in the memory 112.

[Nighttime Blood Pressure Measurement Mode]

The nighttime blood pressure measurement will be described. When the subject 200 who is not sleeping pushes down the nighttime measurement switch 42B of the sphygmomanometer main body 20 once in a state where the cuff 10 of the sphygmomanometer 100 is wound around the left wrist 210 of the subject 200, a nighttime blood pressure measurement instruction (mode instruction) is output to the CPU 110. As a result, the CPU 110 drives the pump 72 and the valve 82 to increase the cuff pressure of the cuff 10, and the left wrist 210 is temporarily compressed by the cuff 10. In this state, the above-described nighttime winding determination program is executed, and a text of "Please rewind" is displayed on the display unit 30 when the cuff 10 is in a loose winding state, or a text of "The winding is appropriate" is displayed on the display unit 30 when the cuff 10 is in a perfect winding state.

Thereafter, the nighttime blood pressure measurement program is executed according to a predetermined schedule. However, when the nighttime measurement switch 42B is pushed down again during the time until the sphygmomanometer 100 measures a blood pressure of the subject sleeping at night (for example, within the waiting time until a predetermined time when the nighttime blood pressure measurement program is executed), the nighttime blood pressure measurement is instructed to stop, and the nighttime blood pressure measurement program is not executed.

In the embodiment, in the schedule of the nighttime blood pressure measurement, the nighttime blood pressure measurement program is executed at a time point when a predetermined time (for example, 4 hours) has elapsed since the nighttime measurement switch 42B is pushed down, and every predetermined time (for example, 2 hours) has elapsed from this time point to a predetermined time (for example, 7:00 am) if necessary. In a mode in which the time at which the nighttime blood pressure measurement is performed is calculated based on the time point when the nighttime measurement switch 42B is pushed down, the nighttime blood pressure measurement program includes a program (not illustrated) that determines measurement time, and the measurement time is determined based on this time determination program.

The execution schedule of the nighttime blood pressure measurement is not limited to this, and the nighttime blood pressure measurement program may be set to be executed at predetermined reservation time, for example, 1:00 am, 2:00, and 3:00.

Figure 7:
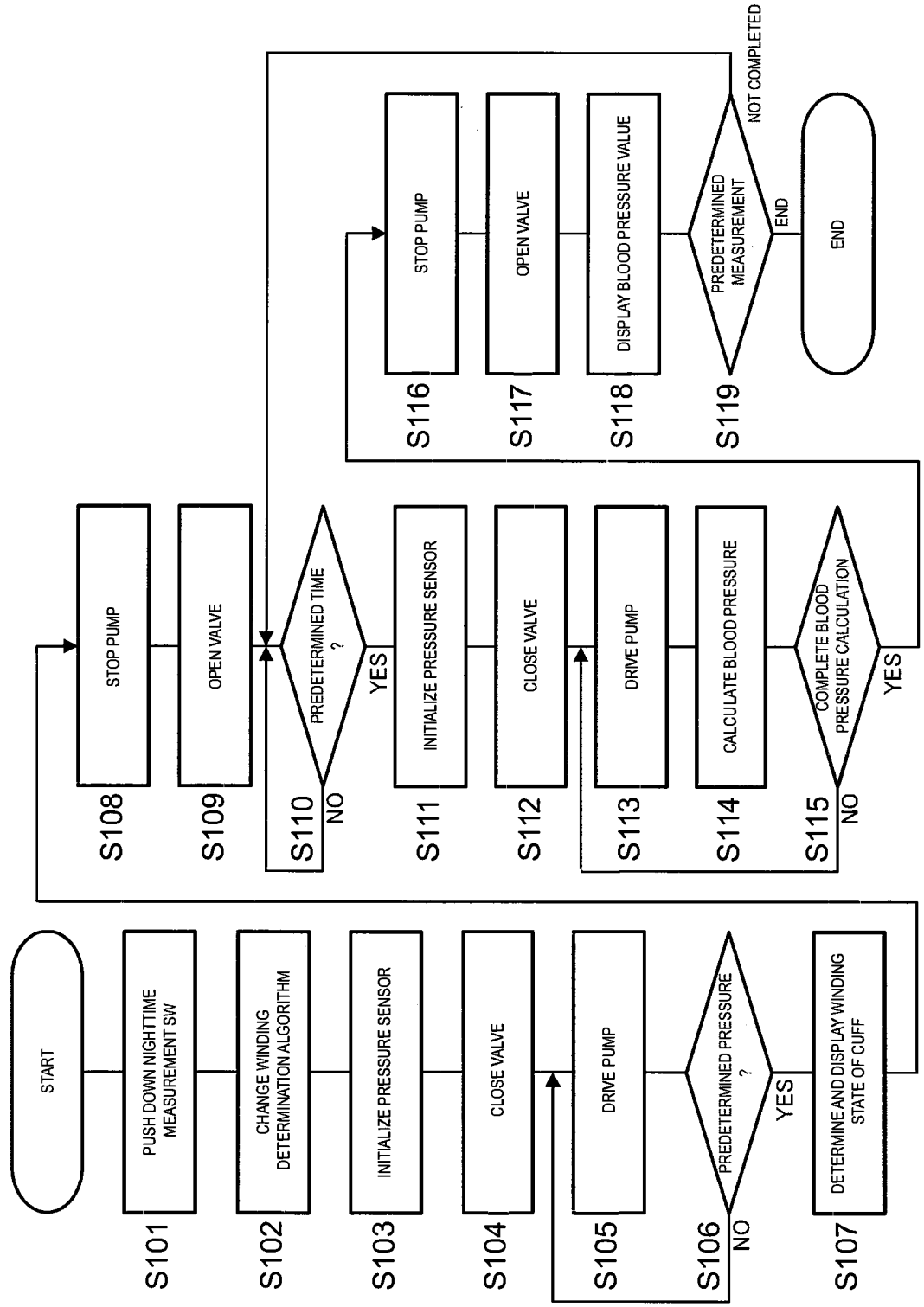
FIG. 7 is a flowchart of nighttime blood pressure measurement performed by the wrist-type sphygmomanometer illustrated in FIG. 1.

FIG. 7 illustrates an operation flow when the subject 200 performs the nighttime blood pressure measurement by the sphygmomanometer 100. During the nighttime blood pressure measurement, the subject 200 wearing the sphygmomanometer 100 on the left wrist 210 remains lying on a bed or the like.

In this state, as illustrated in step S101 of FIG. 7, when the subject 200 pushes down the nighttime measurement switch 42B provided in the sphygmomanometer main body 20, and inputs a nighttime blood pressure measurement instruction, the CPU 110 switches the program for determining a winding state of the cuff 10 from the normal winding determination program to the nighttime winding determination program, and sets the nighttime winding determination program (step S102).

Next, the CPU 110 initializes the pressure sensor (step S103). Specifically, the CPU 110 initializes a processing memory area, stops the pump 72, and performs a 0 mmHg adjustment (The atmospheric pressure is set to 0 mmHg.) of the pressure sensor 62 in a state where the valve 82 is opened.

Next, the CPU 110 closes the valve 82 via the valve drive circuit 84 (step S104), and then drives the pump 72 via the pump drive circuit 74 to start pressurization of the cuff 10 (air bladder 12) (step S105).

When the cuff pressure output by the pressure sensor 62 does not reach a predetermined pressure (when the process branches to NO in step S106), the CPU 110 repeats step S105 and obtains, from a change in the cuff pressure output by the pressure sensor 62, the first time period 336 during which the cuff pressure changes from the first pressure P1 to the second pressure P2, and the second time period 346 during which the cuff pressure changes from the third pressure P3 to the fourth pressure P4.

When the cuff pressure output by the pressure sensor 62 reaches the predetermined pressure (fourth pressure P4) (when branching to YES in step S106), the CPU 110 determines a winding state of the cuff 10 using the above-described nighttime winding determination program stored in the memory 112 on the basis of the obtained first time period 336 and second time period 346, and outputs a text "Please rewind" if the cuff 10 is in a loose winding state or a text "The winding is appropriate" if the cuff 10 is in a perfect winding state to the display unit 30 (step S107). Here, in the nighttime winding determination program, appropriateness/inappropriateness of the winding state of the cuff 10 is determined according to the above-described strict determination criterion. Therefore, the subject can correct the winding state of the cuff 10 to such an extent that the winding state of the cuff 10 is determined to be "appropriate" according to the strict determination criterion. Thus, when the sphygmomanometer 100 automatically starts the blood pressure measurement according to the schedule in the nighttime blood pressure measurement mode, the winding state of the cuff is expected to be maintained "appropriately" from the viewpoint of the normal determination criterion. Therefore, according to the sphygmomanometer 100, accurate blood pressure measurement can be performed in the nighttime blood pressure measurement mode.

After displaying the above-described text, the CPU 110 stops the pump 72 (step S108), opens the valve 82 (step S109), and performs control to exhaust the air in the cuff 10 (air bladder 12).

Next, the CPU 110 determines whether it is measurement time defined by the predetermined schedule (step S110), and if it is not the measurement time defined by the schedule (when branching to NO in step S110), waits until the measurement time comes.

When the measurement time comes (when the process branches to YES in step S110), the CPU 110 initializes the pressure sensor 62 as in step S2 in FIG. 6 (step S111).

Next, as in steps S3 and S4 in FIG. 6, the CPU 110 closes the valve 82 via the valve drive circuit 84 (step S112), and then drives the pump 72 via the pump drive circuit 74 to start pressurization of the cuff 10 (air bladder 12) (step S113). At this time, the CPU 110 controls a pressurization rate of the cuff pressure that is a pressure in the air bladder 12 based on the output of the pressure sensor 62 while supplying air from the pump 72 to the air bladder 12 through the air pipe 50.

Next, in step S114, the CPU 110 calculates blood pressure values (the maximum blood pressure and the minimum blood pressure) using the above-described nighttime blood pressure measurement program stored in the memory 112 based on a pulse wave signal obtained at this time, similarly to step S7 of FIG. 6.

At this time point, when the blood pressure values cannot be calculated yet due to lack of data (when the process branches to NO in step S115), the CPU 110 repeats the processing in steps S113 and S114 unless the cuff pressure reaches an upper limit pressure (For safety, for example, 300 mmHg is predetermined).

When the blood pressure value is calculated (when the process branches to YES in step S115), the CPU 110 stops the pump 72 (step S116), opens the valve 82 (step S117), and performs control to discharge the air in the cuff 10 (air bladder 12).

Thereafter, the CPU 110 displays the calculated blood pressure value on the display unit 30 (step S118), and performs control to store the blood pressure value in the memory 112.

When one blood pressure measurement specified in the above schedule is completed, the CPU 110 determines whether or not all the blood pressure measurements specified in the above schedule are completed (step S119). In a case where the blood pressure measurement specified in the above-described schedule is still scheduled (when it branches to "not completed" in step S119), the CPU 110 returns to step S110, determines whether or not it is the next measurement time specified in the above-described schedule, and waits until the measurement time is reached if it is not the measurement time (when it branches to NO in step S110).

When it is the next measurement time specified in the schedule (when branching to YES in step S110), the CPU 110 repeats the processing of steps S111 to S118, and again determines whether or not all the blood pressure measurements specified in the schedule are completed in step S119. Here, while repeating the processing of steps S111 to S118, the CPU 110 does not operate the nighttime winding determination program of steps S103 to S109 so that unnecessary winding determination is not performed. Therefore, when the blood pressure measurement is automatically started by the second and subsequent processing of steps S111 to S118 according to the schedule, neither the determination of the winding state of the cuff 10 nor the notification of the determined winding state is performed. As a result, it is possible to prevent the CPU 110 from making unnecessary determination and attempting unnecessary notification. Therefore, it is possible to contribute to power saving.

When all the blood pressure measurements specified in the schedule described above are completed (when the process branches to "end" in step S119), the CPU 110 ends the nighttime blood pressure measurement.

In the normal and nighttime blood pressure measurements described above, by displaying (steps S6 and S107) the text "Please rewind" if the cuff 10 is in a loose winding state, or the text "The winding is appropriate" if the cuff 10 is in a perfect winding state, the subject 200 can grasp the winding state of the cuff 10 before the blood pressure measurement is actually performed. When the text "Please rewind" is displayed, the subject 200 can stop the blood pressure measurement and rewind the cuff 10. Therefore, since the cuff 10 is easily wound around the left wrist 210 of the subject 200 in a state of being perfectly wound, the blood pressure of the subject 200 can be accurately measured even when the subject 200 is sleeping.

Further, since the nighttime winding determination program executed in the nighttime blood pressure measurement determines the winding state of the cuff 10 under a threshold smaller than that of the normal winding determination program, that is, under a severe condition, the subject 200 is urged to wind the cuff 10 in a more perfectly wound state or a slightly tightly wound state. As a result, even if pressurization and depressurization are repeated in the cuff in the nighttime blood pressure measurement, the winding of the cuff 10 is not loosened, and the blood pressure measurement is correctly performed.

As described above, according to the sphygmomanometer 100, in the nighttime blood pressure measurement mode, the blood pressure measurement by the oscillometric method is performed with the cuff wound in an appropriate state. Therefore, according to this sphygmomanometer, accurate blood pressure measurement can be performed when the blood pressure measurement is performed while the subject is sleeping.

Since the sphygmomanometer 100 is a type that presses a wrist (Although the left wrist 210 is used in the embodiment, a right wrist may be used.) as a measurement target site, it is expected that the sphygmomanometer is less likely to disturb the sleep of the subject 200 than a type that presses an upper arm (Imai et al., "Development and evaluation of a home nocturnal blood pressure monitoring system using a wrist-cuff device", Blood Pressure Monitoring 2018, 23, P318-326). Therefore, the sphygmomanometer 100 is suitable for the nighttime blood pressure measurement.

Further, since the sphygmomanometer 100 is integrally and compactly configured as a wrist-type sphygmomanometer, the subject 200 can easily handle the sphygmomanometer.

Other Embodiments

Figure 8:
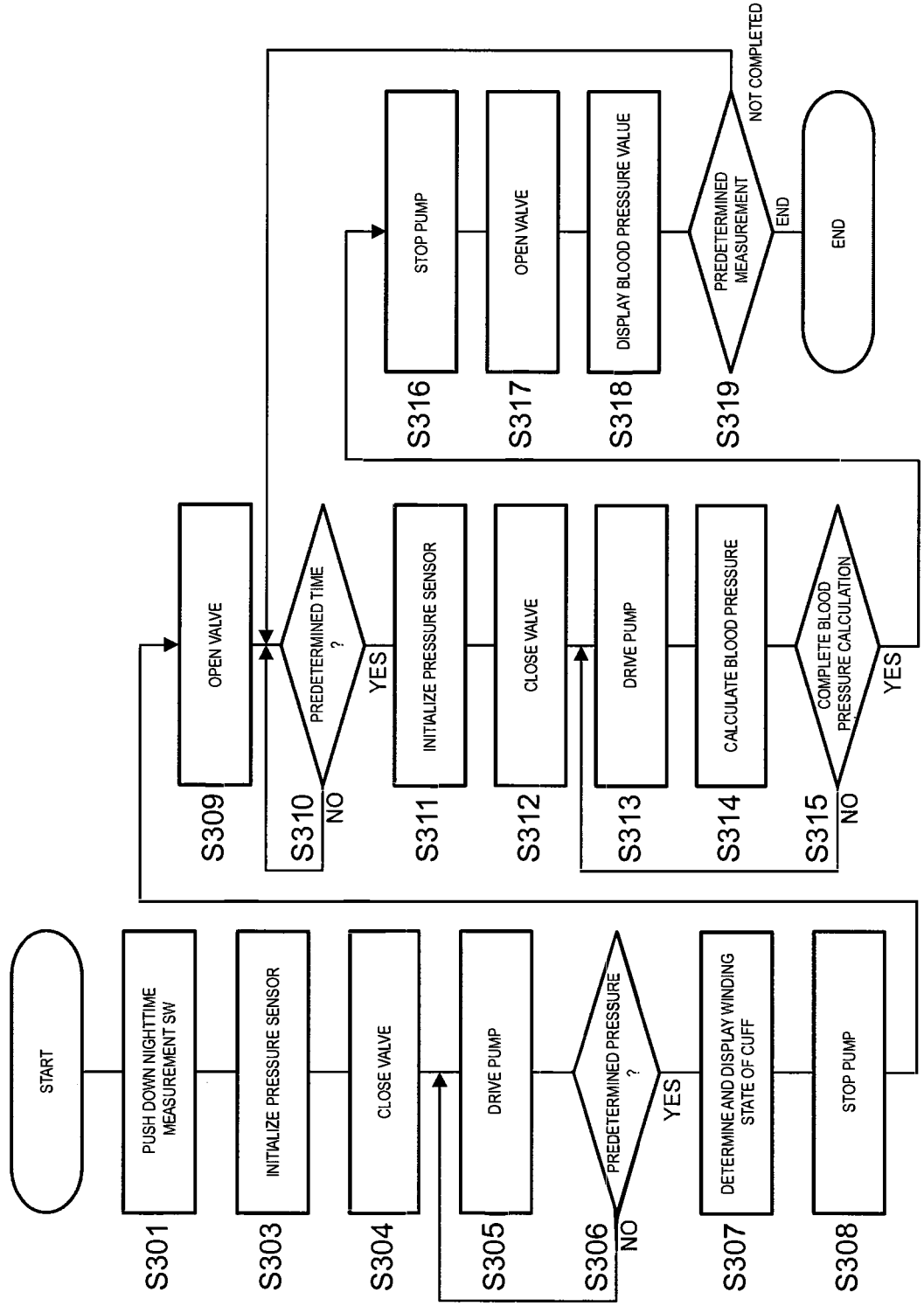
FIG. 8 is a flowchart of nighttime blood pressure measurement performed by a wrist-type sphygmomanometer according to another embodiment.

In the above-described embodiment, the CPU 110 switches from the normal winding determination program to the nighttime winding determination program in order to determine the winding state of the cuff 10 under severe conditions in step S102 in the nighttime blood pressure measurement. However, as illustrated in FIG. 8, the normal winding determination program may be executed even in the nighttime blood pressure measurement without switching.

In the above-described embodiment, the CPU 110 calculates the blood pressure in the pressurization process of the cuff 10 (air bladder 12), but may calculate the blood pressure in a depressurization process of the cuff.

In the embodiment described above, the sphygmomanometer 100 includes the display unit 30 that displays the text "Please rewind" if the cuff 10 is in a loose winding state or the text "The winding is appropriate" if the cuff 10 is in a perfect winding state. However, the winding determination result may be notified to the subject by a voice notification unit that notifies the subject by reading out the content of the text by voice.

In the above-described embodiment, the sphygmomanometer 100 includes the blood pressure measurement switch 42A to which a normal blood pressure measurement instruction is input, and the nighttime measurement switch 42B to which a nighttime blood pressure measurement instruction is input. However, for example, a signal reception unit of the sphygmomanometer receives an instruction (mode instruction) from a smartphone or the like existing outside the sphygmomanometer via wireless communication, and a signal received by the signal reception unit may be replaced with a signal output from the normal blood pressure measurement switch or the nighttime measurement switch to the CPU.

In the above-described embodiment, the sphygmomanometer 100 is configured such that the blood pressure measurement switch 42A outputs a signal of the normal blood pressure measurement instruction to the CPU 110, and the nighttime measurement switch 42B outputs a signal of the nighttime blood pressure measurement instruction to the CPU 110. However, for example, the sphygmomanometer may be configured such that the blood pressure measurement switch is pressed once to output a signal of the normal blood pressure measurement instruction (mode instruction) to the CPU, and the blood pressure measurement switch is pressed twice within a certain period of time to output a signal of the nighttime blood pressure measurement instruction (mode instruction) to the CPU.

In the above-described embodiment, the sphygmomanometer main body 20 is integrally attached to the cuff 10, but may be provided separately from the cuff and connected to the cuff 10 (air bladder 12) via a flexible air tube so as to be able to flow in a fluid.

In the above-described embodiment, the normal blood pressure measurement program, the nighttime blood pressure measurement program, the normal winding determination program, the nighttime winding determination program, and the flows thereof are stored in the memory 112 as software, but may be recorded in a non-transitory medium such as a compact disc (CD), a digital universal disc (DVD), or a flash memory. By installing software recorded in the above-described medium in a substantial computer device such as a personal computer, a personal digital assistant (PDA), or a smartphone, the above-described program and flow can be executed by the computer device.

As described above, the sphygmomanometer of the present disclosure performs blood pressure measurement by an oscillometric method using a pressure sensor that detects a pressure inside a blood pressure measuring cuff by temporarily pressing a wrist as a measurement target site with the cuff, the sphygmomanometer comprising:
　a mode operation unit that inputs a mode instruction for switching a mode between a normal blood pressure measurement mode in which the blood pressure measurement is performed according to an input blood pressure measurement instruction and a nighttime blood pressure measurement mode in which the blood pressure measurement is automatically started according to a predetermined schedule;
　a first determination unit that temporarily pressurizes the cuff to a pressure lower than a cuff pressure used for the blood pressure measurement along with an input of the mode instruction and a shift to the nighttime blood pressure measurement mode, and determines a winding state of the cuff based on an output of the pressure sensor; and
　a second determination unit that temporarily pressurizes the cuff to a pressure lower than the cuff pressure used for the blood pressure measurement, and determines a winding state of the cuff according to a normal determination criterion that defines a degree of the winding state of the cuff based on an output of the pressure sensor, in advance before the blood pressure measurement instruction is input and the blood pressure measurement is performed in the normal blood pressure measurement mode,
　wherein the first determination unit determines the winding state of the cuff according to a strict determination criterion shifted in a direction in which the degree of the winding state of the cuff becomes tighter than the normal determination criterion in the nighttime blood pressure measurement mode, and
　the sphygmomanometer includes
　a notification unit that, along with determination of the winding state of the cuff, notifies the determined winding state of the cuff.

In the present specification, the "mode operation unit" is, for example, a switch provided in a main body of the sphygmomanometer, and may receive a switch on as an instruction by a user, or may be configured by a communication unit that receives an instruction from a smartphone or the like existing outside the sphygmomanometer via wireless communication.

"Along with a shift to the nighttime blood pressure measurement mode" typically refers to a time point at which the shift to the nighttime blood pressure measurement mode is made, but may be within a time at which the subject is expected not to fall asleep yet, for example, within 5 minutes from the time point. Similarly, "along with determination of the winding state of the cuff" typically refers to a time point at which the winding state of the cuff is determined, but may be within a time period in which the subject is expected not to fall asleep yet, for example, within 5 minutes from the time point.

The "winding state of the cuff" refers to a state representing appropriateness/inappropriateness of winding of the cuff around the measurement target site. For example, as disclosed in Patent Document 1, it indicates whether the cuff is tightly wound around the measurement site ("tight winding"), "perfectly" wound ("perfect winding"), or loosely wound ("loose winding"). In addition, the "degree of the winding state of the cuff" refers to a degree from a state in which the cuff is loosely wound around the measurement target site to a state in which the cuff is tightly wound around the measurement target site.

In the sphygmomanometer of the present disclosure, the second determination unit temporarily pressurizes the cuff to a pressure lower than the cuff pressure used for the blood pressure measurement, and determines a winding state of the cuff according to a normal determination criterion that defines the degree of the winding state of the cuff based on an output of the pressure sensor, in advance before the blood pressure measurement instruction is input and the blood pressure measurement is performed in the normal blood pressure measurement mode. Along with the determination of the winding state of the cuff, the notification unit notifies the determined winding state of the cuff. By this notification, the subject can recognize appropriateness/inappropriateness of winding the cuff around the measurement target site according to the normal determination criterion. Therefore, for example, if the winding state of the cuff is inappropriate according to the normal determination criterion and the cuff is loosely wound ("loose winding"), the subject can correct the state to a "perfectly" wound state ("perfect winding"). As in the conventional example, by performing the blood pressure measurement only when the winding state of the cuff is "perfect winding", a measurement result obtained in the normal blood pressure measurement mode is highly reliable.

Further, in the sphygmomanometer of the present disclosure, for example, the subject inputs a mode instruction for switching the mode to the nighttime blood pressure measurement mode in which the blood pressure measurement is automatically started according to a predetermined schedule by the mode operation unit. As a result, the sphygmomanometer shifts to the nighttime blood pressure measurement mode. In the nighttime blood pressure measurement mode, when the sphygmomanometer automatically starts the blood pressure measurement according to the schedule, it cannot be expected that the subject who is sleeping corrects the winding state of the cuff. Here, as the mode instruction is input and the sphygmomanometer shifts to the nighttime blood pressure measurement mode, the first determination unit temporarily pressurizes the cuff to a pressure lower than the cuff pressure used for the blood pressure measurement, and determines a winding state of the cuff according to a strict determination criterion shifted to a direction in which a degree of the winding state of the cuff is tighter than the normal determination criterion based on an output of the pressure sensor. Along with the determination of the winding state of the cuff, the notification unit notifies the determined winding state of the cuff. With this notification, the subject can recognize the appropriateness/inappropriateness of winding the cuff around the measurement target site according to the strict determination criterion. Therefore, for example, if the winding state of the cuff is inappropriate according to the strict determination criterion and the cuff is loosely wound ("loose winding"), the subject can correct the state to a "perfectly" wound state ("perfect winding"). Thereafter, the sphygmomanometer automatically starts the blood pressure measurement according to the predetermined schedule in the nighttime blood pressure measurement mode. As a result, in the nighttime blood pressure measurement mode, the blood pressure measurement by the oscillometric method is performed in a state in which the winding state of the cuff is appropriate according to the strict determination criterion. Therefore, according to this sphygmomanometer, accurate blood pressure measurement can be performed when the blood pressure measurement is performed while the subject is sleeping.

The present disclosure provides the sphygmomanometer according to one embodiment, wherein
the first determination unit determines appropriateness/inappropriateness of the winding state of the cuff in accordance with the determined winding state of the cuff according to the strict determination criterion,
the second determination unit determines appropriateness/inappropriateness of the winding state of the cuff in accordance with the determined winding state of the cuff according to the normal determination criterion, and
the notification unit notifies the appropriateness/inappropriateness of the winding state of the cuff.

In the sphygmomanometer according to this embodiment, the second determination unit temporarily pressurizes the cuff to a pressure lower than the cuff pressure used for the blood pressure measurement, and determines the appropriateness/inappropriateness of the winding state of the cuff according to the normal determination criterion based on the output of the pressure sensor, in advance before the blood pressure measurement instruction is input and the blood pressure measurement is performed in the normal blood pressure measurement mode. Therefore, as in the conventional example, by performing the blood pressure measurement only when the winding state of the cuff is "appropriate", the measurement result obtained in the normal blood pressure measurement mode is highly reliable.

On the other hand, in the sphygmomanometer of this embodiment, the first determination unit determines the appropriateness/inappropriateness of the winding state of the cuff according to the strict determination criterion in the nighttime blood pressure measurement mode. As described above, as the winding state of the cuff is determined, the notification unit notifies the appropriateness/inappropriateness of the determined winding state of the cuff. With this notification, the subject can recognize the appropriateness/inappropriateness of winding the cuff around the measurement target site. Therefore, the subject can correct the winding state of the cuff to such an extent that the winding state of the cuff is determined to be "appropriate" according to the strict determination criterion. Thus, when the sphygmomanometer automatically starts the blood pressure measurement according to the schedule in the nighttime blood pressure measurement mode, the winding state of the cuff is expected to be maintained "appropriately" from the viewpoint of the normal determination criterion. Therefore, according to this sphygmomanometer, accurate blood pressure measurement can be performed in the nighttime blood pressure measurement mode.

The present disclosure provides the sphygmomanometer according to one embodiment, further comprising a control unit that deactivates the first determination unit and the notification unit when the blood pressure measurement is automatically started according to the schedule in the nighttime blood pressure measurement mode.

At the stage of shifting to the nighttime blood pressure measurement mode and waiting for the schedule of the blood pressure measurement, the subject is expected to be in the sleep state. Even if the notification by the notification unit is attempted, it seems that the subject in the sleep state does not notice the notification. Accordingly, in the sphygmomanometer of this embodiment, when the blood pressure measurement is automatically started according to the schedule in the nighttime blood pressure measurement mode, the first determination unit and the notification unit are not operated by the control unit. Therefore, when the blood pressure measurement is automatically started according to the schedule, neither the determination of the winding state of the cuff nor the notification of the determined winding state of the cuff is performed. This prevents the first determination unit from making a useless determination and prevents the notification unit from attempting a useless notification. Therefore, it is possible to contribute to power saving.

The present disclosure provides the sphygmomanometer according to one embodiment, wherein the measurement target site is a wrist.

Since the sphygmomanometer of the present embodiment is a type that presses a wrist as the measurement target site, it is expected that the sphygmomanometer has less degree of hindrance of the sleep of the subject than a type that presses an upper arm (Imai et al., "Development and evaluation of a home nocturnal blood pressure monitoring system using a wrist-cuff device", Blood Pressure Monitoring 2018, 23, P318-326). Therefore, this sphygmomanometer is suitable for the nighttime (sleep) blood pressure measurement.

The present disclosure provides the sphygmomanometer according to one embodiment, further comprising a main body provided integrally with the blood pressure measuring cuff,
 wherein the main body is equipped with a blood pressure measurement unit that temporarily presses the wrist by the blood pressure measuring cuff and performs the blood pressure measurement by the oscillometric method using the pressure sensor that detects a pressure in the cuff, the mode operation unit, the first determination unit, and the notification unit.

Here, the "blood pressure measurement unit" includes, for example, a pump that supplies a pressurizing fluid to the blood pressure measuring cuff, a valve that exhausts the fluid from the blood pressure measuring cuff, and elements that drive and control these pump, valve, and the like.

The sphygmomanometer of the present embodiment can be configured integrally and compactly. Therefore, handling by a user is convenient.

In another aspect, a blood pressure measurement method of the present disclosure is implemented with a sphygmomanometer that performs blood pressure measurement by an oscillometric method using a pressure sensor that detects a pressure inside a blood pressure measuring cuff by temporarily pressing a measurement target site of a subject with the cuff,
 the sphygmomanometer including a mode operation unit that inputs a mode instruction for switching a mode between a normal blood pressure measurement mode in which the blood pressure measurement is performed according to an input blood pressure measurement instruction and a nighttime blood pressure measurement mode in which the blood pressure measurement is automatically started according to a predetermined schedule,
 the blood pressure measurement method comprising:
 a first determination method of temporarily pressurizing the cuff to a pressure lower than a cuff pressure used for the blood pressure measurement along with an input of the mode instruction and a shift to the nighttime blood pressure measurement mode, and determining a winding state of the cuff based on an output of the pressure sensor; and
 a second determination method of temporarily pressurizing the cuff to a pressure lower than the cuff pressure used for the blood pressure measurement, and determining a winding state of the cuff according to a normal determination criterion that defines a degree of the winding state of the cuff based on an output of the pressure sensor, in advance before the blood pressure measurement instruction is input and the blood pressure measurement is performed in the normal blood pressure measurement mode,
 wherein the first determination method determines the winding state of the cuff according to a strict determination criterion shifted in a direction in which the degree of the winding state of the cuff becomes tighter than the normal determination criterion in the nighttime blood pressure measurement mode, and
 the blood pressure measurement method includes determining the winding state of the cuff according to the first determination method or the second determination method, and
 along with determination of the winding state of the cuff, notifying the determined winding state of the cuff.

According to the blood pressure measurement method of the present disclosure, accurate blood pressure measurement can be performed when the blood pressure measurement is performed while the subject is sleeping.

In still another aspect, a computer-readable recording medium of the present disclosure is a computer-readable recording medium non-transitorily storing a program for causing a computer to execute the blood pressure measurement method.

By making a computer read the program stored in the computer-readable recording medium according to the present disclosure and causing a computer to execute the program, the blood pressure measurement method can be implemented.

As is clear from the above, according to the sphygmomanometer and the blood pressure measurement method of the present invention, accurate blood pressure measurement can be performed when the blood pressure measurement is performed while the subject is sleeping. Further, according to the program stored in the computer-readable recording medium of the present invention, it is possible to cause a computer to execute such a blood pressure measurement method.

It is to be noted that the various embodiments described above can be appreciated individually within each embodiment, but the embodiments can be combined together. It is also to be noted that the various features in different embodiments can be appreciated individually by its own, but the features in different embodiments can be combined.

The invention claimed is:

1. A sphygmomanometer that performs blood pressure measurement by an oscillometric method using a pressure sensor that detects a pressure inside a blood pressure measuring cuff configured to press a measurement target site of a subject with the cuff, the sphygmomanometer comprising:
 a mode operation unit that includes a switch and/or a wireless communication interface, and inputs, by the switch being operated and/or receiving an instruction via the wireless communication interface from an outside of the sphygmomanometer, a mode instruction for switching a mode between a normal blood pressure measurement mode in which the blood pressure measurement is performed according to an input blood pressure measurement instruction and a nighttime blood pressure measurement mode in which the blood pressure measurement is automatically started according to a predetermined schedule;
a display and/or a voice device for notifying the subject; and
a processor, wherein
the processor is configured to:
  act as a first determination unit to temporarily pressurize the cuff to a pressure lower than a cuff pressure used for the blood pressure measurement and determines and determine a first winding state of the cuff based on an output of the pressure sensor before starting to wait for a measurement time according to the schedule after an input of the mode instruction and a shift to the nighttime blood pressure measurement mode; and
  act as a second determination unit to temporarily pressurize the cuff to a pressure lower than the cuff pressure used for the blood pressure measurement and determine a second winding state of the cuff according to a normal determination criterion that defines a degree of a winding state of the cuff based on an output of the pressure sensor before starting the blood pressure measurement after an input of the blood pressure measurement instruction in the normal blood pressure measurement mode,
wherein the processor acting as the first determination unit is configured to determine the first winding state of the cuff according to a strict determination criterion that defines a degree of the winding state of the cuff tighter than the degree of the winding state of the cuff defined by the normal determination criterion in the nighttime blood pressure measurement mode, and
the processor is further configured to act as a notification unit to notify the subject of the first winding state of the cuff via the display and/or the voice device before starting to wait for the measurement time according to the schedule after determining the first winding state of the cuff in the nighttime blood pressure measurement mode.

2. The sphygmomanometer according to claim 1, wherein the processor acting as the first determination unit is configured to determine appropriateness or inappropriateness of the first winding state of the cuff in accordance with the first winding state of the cuff according to the strict determination criterion,
the processor acting as the second determination unit is configured to determine appropriateness or inappropriateness of the second winding state of the cuff in accordance with the second winding state of the cuff according to the normal determination criterion, and
the processor acting as the notification unit is configured to notify the subject of the appropriateness or the inappropriateness of the first winding state of the cuff.

3. The sphygmomanometer according to claim 1, the processor is further configured to act as a control unit to deactivate the first determination unit and the notification unit when the measurement time comes after starting to wait for the measurement time according to the schedule in the nighttime blood pressure measurement mode.

4. The sphygmomanometer according to claim 1, wherein the blood pressure measuring cuff is configured to press a wrist as the measurement target site.

5. The sphygmomanometer according to claim 4, further comprising a main body provided integrally with the blood pressure measuring cuff,
wherein the main body is equipped with the mode operation unit, the display and/or the voice device, and the processor, wherein
the processor is configured to act as a blood pressure measurement unit to perform the blood pressure measurement by the oscillometric method according to the input blood pressure measurement instruction in the normal blood pressure measurement mode, and to automatically start and perform the blood pressure measurement according to the schedule in the nighttime blood pressure measurement mode, respectively.

6. A blood pressure measurement method for the sphygmomanometer according to claim 1,
the blood pressure measurement method comprising:
a first determination method of temporarily pressurizing the cuff to a pressure lower than a cuff pressure used for the blood pressure measurement and determining a first winding state of the cuff based on an output of the pressure sensor before starting to wait for a measurement time according to the schedule after an input of the mode instruction and a shift to the nighttime blood pressure measurement mode by the processor acting as the first determination unit; and
a second determination method of temporarily pressurizing the cuff to a pressure lower than the cuff pressure used for the blood pressure measurement, and determining a second winding state of the cuff according to a normal determination criterion that defines a degree of the winding state of the cuff based on an output of the pressure sensor before starting the blood pressure measurement after an input of the blood pressure measurement instruction in the normal blood pressure measurement mode by the processor acting as the second determination unit,
wherein the first determination method determines the first winding state of the cuff according to a strict determination criterion that defines a degree of the winding state of the cuff tighter than the degree of the winding state of the cuff defined by the normal determination criterion in the nighttime blood pressure measurement mode, and
the blood pressure measurement method further includes notifying the subject of the first winding state of the cuff via the display and/or the voice device before starting to wait for the measurement time according to the schedule after determining the first winding state of the cuff in the nighttime blood pressure measurement mode by the processor acting as the notification unit.

7. A computer-readable recording medium non-transitorily storing a program for causing a computer to execute the blood pressure measurement method according to claim 6.

* * * * *